W. F. MAAS.
PLANT SUPPORT.
APPLICATION FILED MAY 23, 1914.
1,146,891.
Patented July 20, 1915.
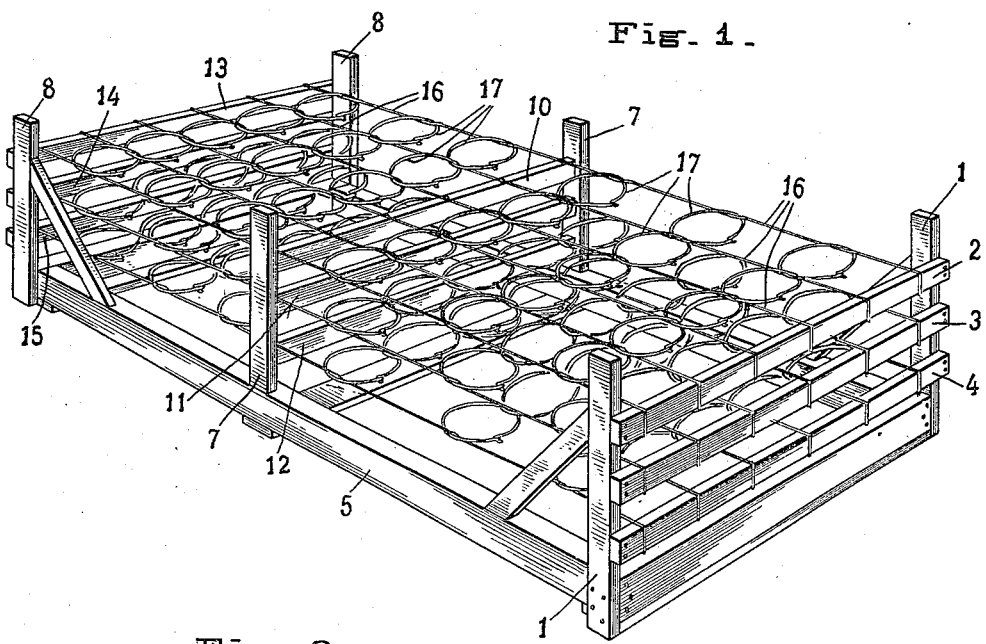
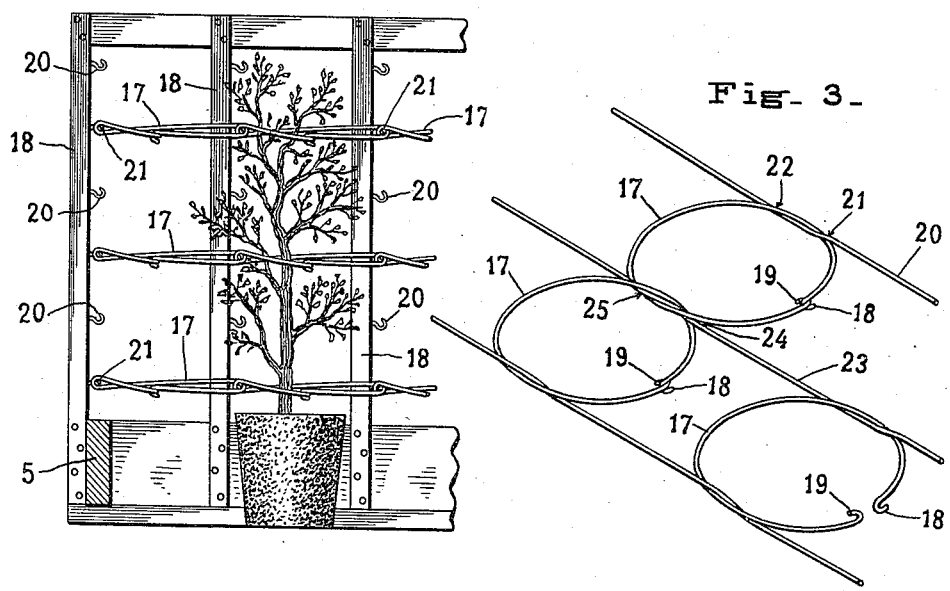
Witnesses:
Inventor
William F. Maas,
By his Attorney
COLUMBIA PLANOGRAPH CO., WASHINGTON, D. C.

UNITED STATES PATENT OFFICE.

WILLIAM F. MAAS, OF CINCINNATI, OHIO, ASSIGNOR TO PETER IGOE, JR., OF BROOKLYN, NEW YORK.

PLANT-SUPPORT.

1,146,891.   Specification of Letters Patent.   Patented July 20, 1915.

Application filed May 23, 1914. Serial No. 840,447.

*To all whom it may concern:*

Be it known that I, WILLIAM F. MAAS, a citizen of the United States, and a resident of Cincinnati, in the county of Hamilton and State of Ohio, have invented certain new and useful Improvements in Plant-Supports, of which the following is a full, clear, and exact description, whereby anyone skilled in the art may make and use the same.

The invention relates to supports for plants, vegetables, hot-house products and in fact wherever an adjustable support is necessary or desirable.

It is particularly well adapted for use in hot-houses, hot-beds and in the garden, as it may be very readily set up and adjusted into position for use to support growths of any sort.

The object of the invention is to provide a very simple, light but firm support for plants and the like and one which may be placed in position either fully assembled or by assembling the various parts to a greater or less extent to cover the requirements for which the support is designed.

A further object is to provide a "knock-down" plant support and one which may be readily assembled with features of adjustability and expansion hereinafter more particularly set forth.

Referring to the drawings, Figure 1 is a perspective view illustrative of the manner of arranging the plant support. Fig. 2 is an end view showing one form of standards to which the supports are secured. Fig. 3 is a detail view illustrating the manner of applying the longitudinal supporting bars and the adjustable encircling members.

It is a common practice to support plants during their growth upon trellises of various sorts and upon sticks or rods which are pushed into the earth adjacent to the plant roots and to which the plants are tied by loops of tape, twine, wire or other material. Such devices are not only crude but a great amount of time must be occupied in caring for the growing plants to insure their being properly supported upon the rods or trellises. Great care must also be taken not to bind the growing plant too firmly as there is liability of scarring the bark and injuring the plant and retarding its growth.

The present invention contemplates a device which may be manufactured as a completed article or may be manufactured and shipped in a "knock-down" form to be subsequently fitted together. It involves the use of substantially parallel retaining members and detachable ring members. The longitudinal members form a direct support for maintaining the rings in position and yet permit a wide latitude of adjustment in the rings. The rings, when interlocked one with another, form a very substantial, stable rack which may be arranged in parallel planes or sections and will provide practically a continuous vertical support for the growing plant.

As illustrated in Fig. 1, a frame having risers 1 and cross-bars 2, 3, 4 is suitably placed at one end of a growing bed 5 and at intervals along said bed are similar risers 7, 8 with cross-bars 10, 11, 12, 13, 14, 15. Secured to the cross-bars are longitudinally extending rods or wires 16 which are arranged substantially parallel with each other in horizontal relation and substantially in the same plane with rods or wires of the coöperating cross-bars considered in a vertical plane. Between the adjacent rods or wires are loops or rings 17 which as illustrated in Fig. 3 are preferably spring-rings having hooks 18, 19 at their adjacent meeting edges by which they may be hooked together forming a complete ring. These rings are threaded over the adjacent horizontal wires in such manner that one wire as 20 extends over the ring as at 21 and under the ring as at 22. The next succeeding parallel wire 23 passes under the ring as at 24 and over the ring as at 25. This, obviously, will prevent tilting of the ring although permitting it to be slid longitudinally along the wires or rods 20, 23.

It is seldom that a single pair of wires and coöperating rings is used as ordinarily in the hot-house bed or flower bed, the growing potted plants are arranged in approximately close parallel rows in both directions. It is therefore customary to arrange a number of the parallel wires with rows of rings interlocked, one with the other and with the wires, so that there are in effect transverse circular openings through which the plants may extend and be supported. This arrangement forms what is practically an adjustable screen-like structure having the rings corresponding to the ordinary mesh of the screen made adjustable and variable as to position. In practice, several of these screens are arranged one above the other. The advantages of the feature of adjustability are therefore at once apparent. When the plant is small, it is passed through the rings of the first screen structure. As it grows, a second screen may be formed above it and its rings may be brought into vertical registration with the rings of the lower tier. As there is still further growth and requirement for support, a third, fourth and as many screens with rings having variable positions as may be desired are used.

It is apparent from the above that the structure is expansible for the purposes of supporting the plant as it grows and being entirely supported from different points, there is no liability of sticks or rods injuring the root formations and impairing the life and growth of the plant.

In Fig. 2, there is illustrated in end view a frame having risers 18 provided at intervals with hooks 20 to which the longitudinal wires 21 may be secured. Laced upon these wires are the rings 17.

It is of course apparent that any form of support may be employed in conjunction with the parallel or longitudinal wires so long as they are properly spaced to permit interlacing of the rings one with the other and with the wires.

The exact form of rings and the size and dimensions thereof as well as the form of the devices for supporting the longitudinal wires may be modified and varied without departing from the spirit or intent of the invention and it is obvious that in place of the spring rings having interlocking ends, solid rings might be employed where the device is completely assembled in web or screen form. There is greater convenience however in using the spring rings as they may be applied to the longitudinal members and may be adjusted as desired.

What I claim as my invention and desire to secure by Letters Patent is:

1. A plant support comprising a series of longitudinally extending supporting rods, rings interlaced thereon and interlaced with each other and adjustable along said rods, a plurality of longitudinal supporting members of similar character arranged in different horizontal planes and each provided with interengaging interlocking and adjustable rings, the various rings adapted to be brought into substantially vertical registration one with the other and means for supporting the longitudinal members in different horizontal planes.

2. A plant support comprising supporting means, longitudinal rods, spring loops having interengaging meeting ends interlaced upon said rods, the adjacent rods passing through the loops and from the loops on opposite sides to maintain said loops in horizontal position though permitting longitudinal adjustment.

3. A plant support comprising supporting means, a plurality of longitudinal supporting rods, spring loops having interengaging ends interlaced with each other transversely of the rods, the alternate rods passing through the loops from opposite sides whereby the interlaced loops are adjustable longitudinally of the rods though held in horizontal position.

4. A plant support comprising supporting means, longitudinal members supported thereby, loops of ring form interlaced upon said longitudinal rods, the adjacent rods passing through the loops and from the loops on opposite sides to maintain said loops in horizontal position though permitting longitudinal adjustment.

5. A plant support comprising supporting means, a plurality of longitudinal supporting rods, loops interlaced with each other transversely of the rods, the alternate rods passing through the loops from opposite sides whereby the interlaced loops are adjustable longitudinally of the rods though held in the plane of the adjacent rods which pass through the loops.

WILLIAM F. MAAS.

Witnesses:
MAY CLAYTON,
PETER WEBER.

Copies of this patent may be obtained for five cents each, by addressing the "Commissioner of Patents, Washington, D. C."